Nov. 12, 1968    J. C. KENNEDY, JR., ET AL    3,410,358
DAMPED AND TUNED DYNAMIC ABSORBER FOR VEHICLES
Filed Dec. 20, 1966    4 Sheets-Sheet 1

INVENTORS
JAMES C. KENNEDY, JR.
DANIEL B. SHOTWELL
BY
ATTORNEYS

Nov. 12, 1968         J. C. KENNEDY, JR., ET AL         3,410,358
DAMPED AND TUNED DYNAMIC ABSORBER FOR VEHICLES
Filed Dec. 20, 1966                                4 Sheets-Sheet 2
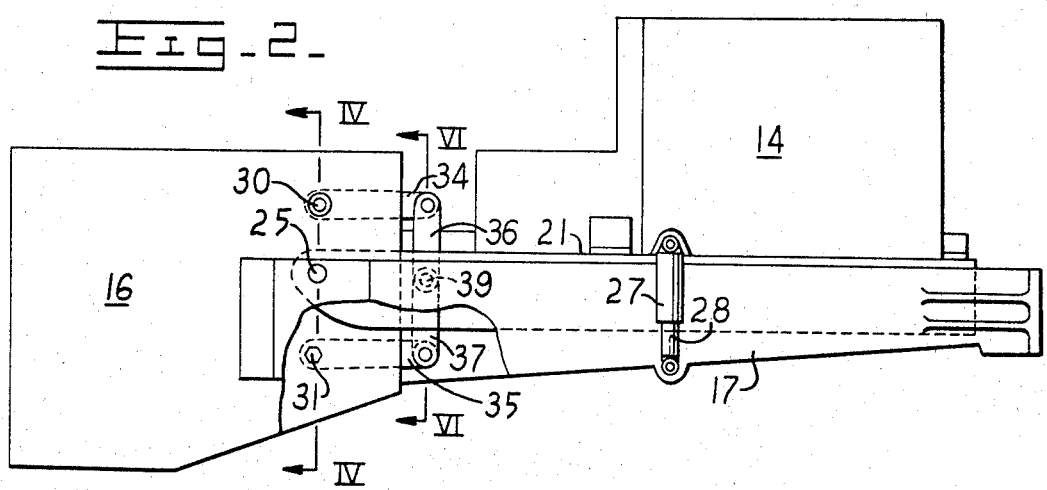
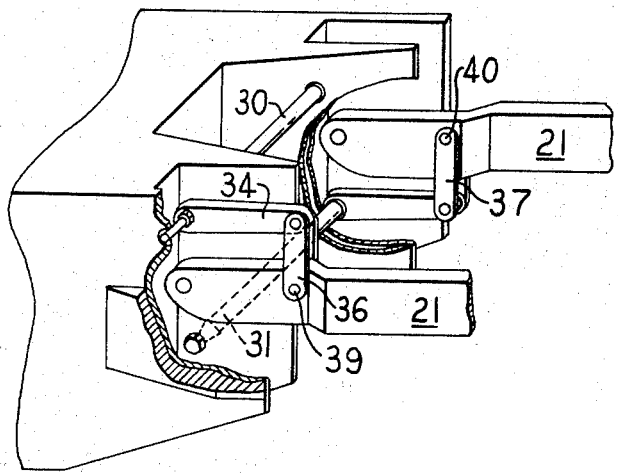
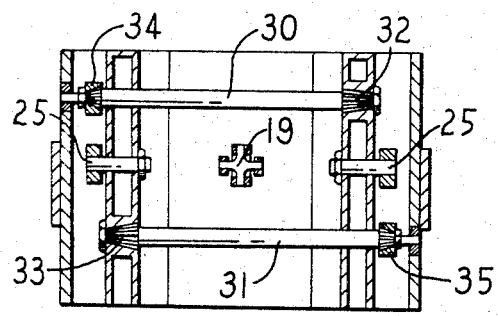
INVENTORS
JAMES C. KENNEDY, JR.
BY DANIEL B. SHOTWELL
ATTORNEYS Nov. 12, 1968    J. C. KENNEDY, JR., ET AL    3,410,358
DAMPED AND TUNED DYNAMIC ABSORBER FOR VEHICLES
Filed Dec. 20, 1966    4 Sheets-Sheet 3
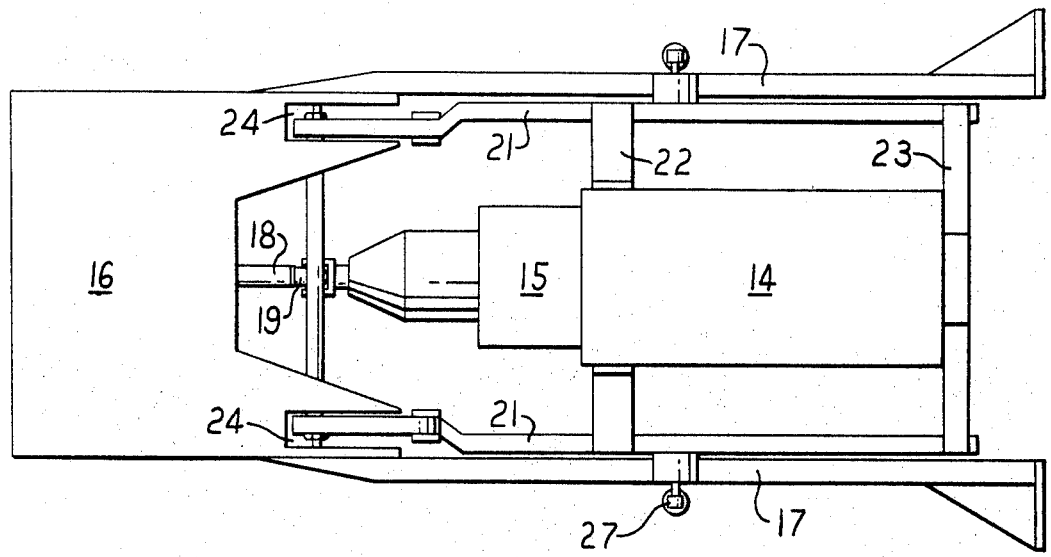
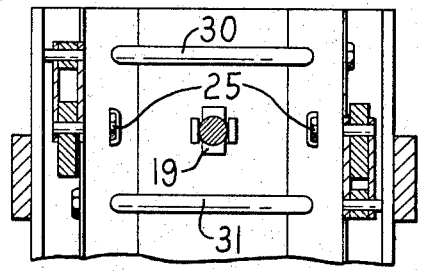
INVENTORS
JAMES C. KENNEDY, JR.
DANIEL B. SHOTWELL
BY
ATTORNEYS

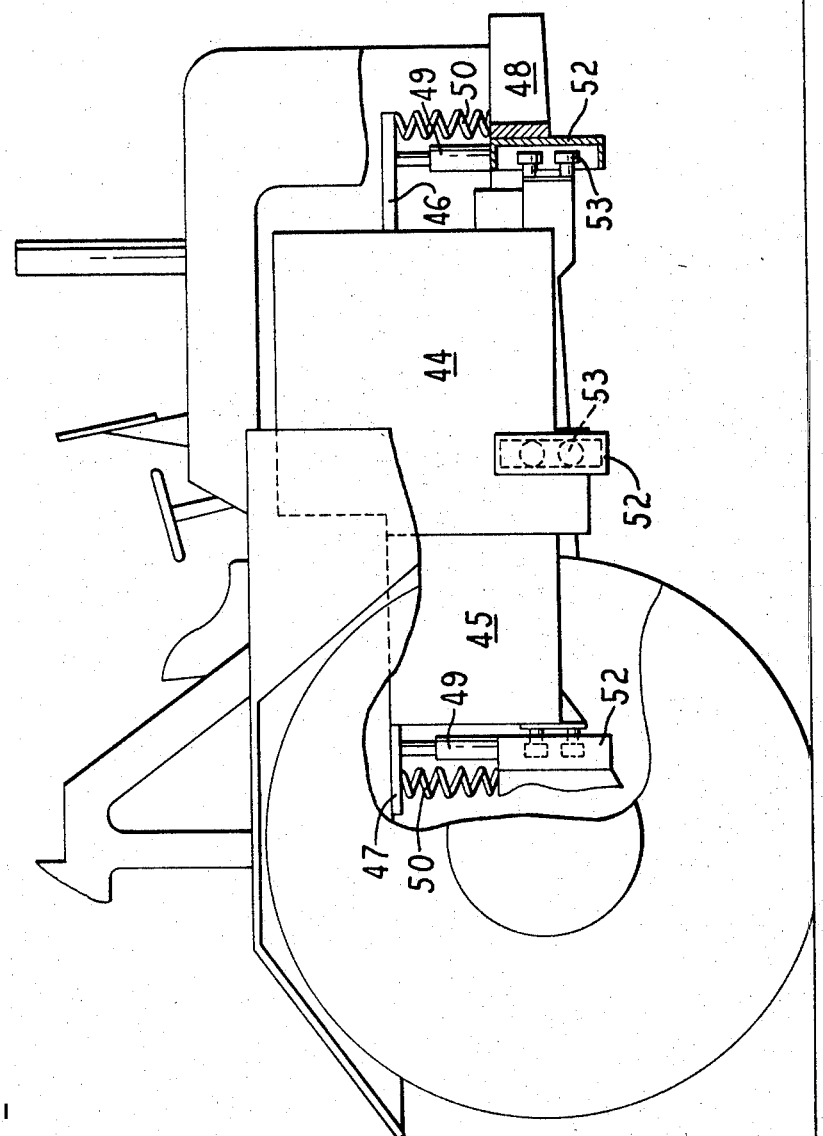

United States Patent Office 3,410,358
Patented Nov. 12, 1968

3,410,358
DAMPED AND TUNED DYNAMIC
ABSORBER FOR VEHICLES
James C. Kennedy, Jr., and Daniel B. Shotwell, Washington, Ill., assignors to Caterpillar Tractor Co., Peoria, Ill., a corporation of California
Filed Dec. 20, 1966, Ser. No. 603,197
2 Claims. (Cl. 180—64)

ABSTRACT OF THE DISCLOSURE

A vibration absorbing mounting for a vehicle engine in which the engine is mounted on a frame movably connected to the vehicle frame and a tuning means in the form of a spring mounting is connected between the engine frame and the vehicle frame. A damping means such as a hydraulic shock absorber is also connected between the engine frame and the vehicle frame and the engine frame may be pivotally connected to the vehicle frame with the tuning means in the form of a torsion bar spaced from the engine frame pivot and connected to the engine frame by linkage means.

---

This invention relates to the damping of vibrations in vehicles, particularly of the rubber tired type, with damping means capable of being tuned, and pertains particularly to a dynamic absorber utilizing the Frahm principle of damping and employing a part of the vehicle as the damper weight.

The well-known Frahm damper utilizes a mass or weight supported to permit oscillation or vibration with tuning and damping means designed to be effective in reducing vibratory motion of the system to which it is attached. In rubber tired vehicles, and particularly large vehicles, considerable difficulties have been encountered in overcoming the severe bouncing which results from the use of large rubber tires in traversing irregular terrain. The Frahm principle has been used in counteracting this bounce and there are instances where, in tractor-trailer combinations, such for example as earth-moving scrapers, the trailer or scraper itself has been utilized as the mass, making unnecessary the addition of great weight to the equipment.

It is the object of the present invention to provide a tuned and damped dynamic absorber for a vehicle or vehicle combination in which the greater portion of the required weight is that of the vehicle engine. Further and more specific objects and advantages of the invention and the manner in which it is carried into practice are made apparent in the following specification wherein reference is made to the accompanying drawings.

In the drawings:

FIG. 2 is a schematic view illustrating the final drive transmission housing and frame of a tractor and showing the engine supported for oscillation on a separate engine frame, in accordance with the present invention;

FIG. 3 is a fragmentary perspective view illustrating connections between the engine frame and the final drive housing;

FIG. 4 is a sectional view taken on the line IV—IV of FIG. 2;

FIG. 5 is a plan view of the assembly illustrated in FIG. 2;

FIG. 6 is a sectional view taken on the line VI—VI of FIG. 2; and

FIG. 7 is a schematic view in side elevation of a tractor showing a modified form of the present invention.

Figure 1:
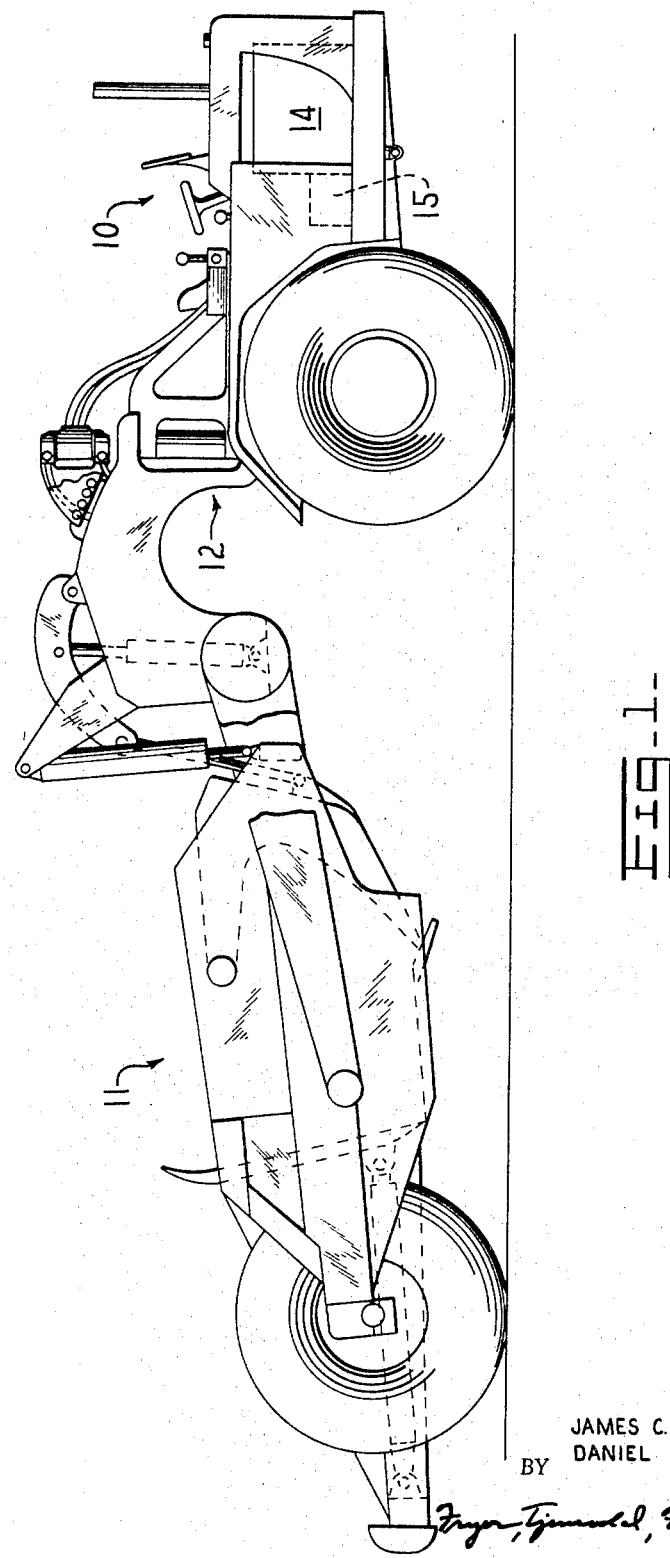
FIG. 1 is a view in side elevation of a tractor-scraper combination showing the location of the engine used as the mass for the absorber of the present invention.

In FIG. 1, a tractor generally indicated at 10 is shown as hitched to a scraper 11 through a coupling or hitch illustrated generally at 12, all of which is entirely conventional. The positions of the engine and transmission and related components of the tractor are indicated at 14 and 15, respectively, and it is the mounting of the engine and transmission in a manner to serve as a tuned and damped absorber with which the present invention is concerned.

Referring to FIGS. 2 and 5, the main frame portions of a tractor are shown as comprising a final drive transmission housing 16, fowardly extending frame members 17, one fixed to each side of the transmission housing and extending forwardly therefrom in spaced relation. The engine 14 and transmission 15 are connected with the final drive through a drive shaft 18, which includes a universal connection 19.

In accordance with the present invention, the weight of the engine and transmission 15 is carried by a separate frame made up of two longitudinally extending members 21 and transverse members 22 and 23. The longitudinal engine frame members are pivotally connected with the final drive housing 16 where they extend into recesses 24 provided for their reception, pivotal connections being formed by pins shown at 25 in FIGS. 2, 4 and 6. These pins are on a common axis which intercepts the universal joint 19, as may best be seen in FIG. 4. Thus, the engine supporting frame is enabled to oscillate in a vertical plane about the axis of vertical pivotal movement made possible by the universal joint, as well as about its pivotal support 25.

Damping means to damp such oscillation when it occurs may be in the form of hydraulic cylinders 27 shown in FIGS. 2 and 5, as pivotally connected to the engine frame and having pistons 8 pivoted to the main frame and acting in the manner of conventional automotive shock absorbers.

Resilient means capable of being tuned are also employed to resist oscillation of the mass provided by the engine frame and the engine, and are shown as torque bars, one of which is illustrated at 30, disposed above the pivot 25, and the other of which is illustrated at 31, disposed below the pivot. Each bar is fixed with respect to the final drive housing at one end, as illustrated at 32 and 33 in FIG. 4, and connected at its opposite end with a forwardly extending lever as shown at 34 and 35 in FIGS. 2, 3 and 4. The forward ends of these levers are connected by links 36 and 37, as shown in FIGS. 2 and 3, with the engine frame members 21 to which they are pivotally connected by pins 39 and 40, as best illustrated in FIG. 3. These pins are axially aligned. With this arrangement, oscillation in a vertical plane about the pivots 25 imparts twisting forces to the bars 30 and 31 through the linkage just described. This twisting force resiliently opposes the oscillation. Tuning is accomplished by selecting the torque bars 30 and 31 having the desired size and resilient characteristics.

A modified form of the invention is illustrated in FIG. 7 wherein the engine is not mounted for pivotal movement but rather for verticle oscillation. This is useable in a vehicle with electric or hydarulic power transmission wherein the rigid drive shaft is not employed so that it is not necessary to oscillate on the transverse axis of a universal joint in the drive shaft. In this modification, an engine 44 and electric generator 45 are shown as supported on a framework having horizontal elements 46 and 47 disposed above the main frame 48 of the tractor. Shock absorbers shown at 49, of which there may be four or more in number, are interposed between the engine supporting frame and the main frame, as are also the springs which, in the present instance, are shown as coil springs 50. Again, tuning may be accomplished by selection of springs having the proper spring rate. While the shock absorber 49 could be of rugged construction to enable them to serve as vertical guides, auxiliary guides may also be provided in the form of channels such as shown at 52 on the main frame and rollers shown at 53 and guided in the channels.

We claim:

1. A vibration absorber for a vehicle having a frame and an engine comprising means supporting the engine for reciprocating motion in a substantially vertical plane, damping means between the frame and the engine, said engine being supported on an engine frame and the engine frame being pivoted relative to the vehicle, tuning means comprising at least one resilient torsion bar fixed relative to the vehicle frame parallel to and spaced from the pivotal axis of the engine frame, and linkage connecting the bar to the engine frame remote from the pivotal support to apply torque to the bar as the engine frame pivots.

2. The combination of claim 1 in which the damping means are hydraulic shock absorbers acting between the vehicle frame and the engine frame.

References Cited

UNITED STATES PATENTS

| 1,084,283 | 1/1914 | Lord | 180—64 |
| 1,795,731 | 3/1931 | Meister | 180—57 |
| 2,209,457 | 7/1940 | Hare | 180—56 |

FOREIGN PATENTS

| 1,357,185 | 2/1964 | France. |
| 981,853 | 1/1965 | Great Britain. |

OTHER REFERENCES

Christian et al.: German application, Ser. No. 1,139,332 printed Nov. 8, 1962, Kl 47a 20.

BENJAMIN HERSH, *Primary Examiner.*

M. L. SMITH, *Assistant Examiner.*